(12) United States Patent
Jacumet et al.

(10) Patent No.: US 7,782,371 B2
(45) Date of Patent: Aug. 24, 2010

(54) APPARATUS FOR THE RECORDING OF IMAGE DATA AND META DATA

(75) Inventors: Klaus Jacumet, Munich (DE); Robert Kandleinsberger, Munich (DE); Michael Koppetz, Munich (DE)

(73) Assignee: Arnold & Richter Cline Technik GmbH & Co. Betriebs KG, Munich (DE)

( * ) Notice: Subject to any disclaimer, the term of this patent is extended or adjusted under 35 U.S.C. 154(b) by 464 days.

(21) Appl. No.: 11/872,980

(22) Filed: Oct. 16, 2007

(65) Prior Publication Data

US 2009/0096891 A1      Apr. 16, 2009

(51) Int. Cl.
  *H04N 5/76*      (2006.01)
(52) U.S. Cl. .................................... 348/231.3
(58) Field of Classification Search .............. 348/231.3
   See application file for complete search history.

(56) References Cited

U.S. PATENT DOCUMENTS

| 4,217,050 | A | * | 8/1980 | Sato et al. .................... 396/384 |
| 4,312,581 | A | * | 1/1982 | Miyagawa et al. .......... 396/283 |
| 4,938,585 | A | * | 7/1990 | Weiffenbach et al. ......... 352/92 |
| 5,285,225 | A | * | 2/1994 | Blaschek et al. .............. 352/93 |
| 5,339,123 | A | * | 8/1994 | Soshi et al. ................. 396/318 |
| 5,532,773 | A | * | 7/1996 | Shaw et al. ................ 353/26 A |
| 6,621,552 | B2 | * | 9/2003 | Bauer ........................... 352/12 |
| 6,831,729 | B1 | * | 12/2004 | Davies ............................. 352/3 |
| 2009/0002495 | A1 | * | 1/2009 | Jacumet ....................... 348/187 |
| 2009/0002511 | A1 | * | 1/2009 | Jacumet ................... 348/222.1 |

FOREIGN PATENT DOCUMENTS

| DE | 33 36 228 A1 | 4/1984 |
| DE | 35 08 859 A1 | 10/1986 |
| DE | 198 59 087 A1 | 6/2000 |
| EP | 0 938 024 A1 | 8/1999 |
| EP | 0 940 713 A1 | 9/1999 |
| GB | 2 282 929 A | 4/1995 |

OTHER PUBLICATIONS

German Search Report dated Aug. 21, 2007. Application No. DE 10 2006 046 280.7.

* cited by examiner

*Primary Examiner*—James M Hannett
(74) *Attorney, Agent, or Firm*—Gifford, Krass, Sprinkle, Anderson & Citkowski, P.C.

(57) ABSTRACT

The invention relates to an apparatus for the recording of image data and meta data which contain information on the image data—such as recording parameters—with a digital camera which includes at least one image sensor for the generation of the image data and with meta data image generation means by which the meta data can be recorded in the form of image information detectable by the human eye so that the image data and the meta data can be generated as common image information, with the meta data image generation means including display means for the visual presentation of meta data, in particular a display, and/or data processing means for the electronic generation of the meta data inside the image data, in particular a controller.

25 Claims, 7 Drawing Sheets

APPARATUS FOR THE RECORDING OF IMAGE DATA AND META DATA

The present invention relates to an apparatus for the recording of image data and meta data which contain information on the image data—such as recording parameters—with a digital film camera, i.e. a digital motion picture camera, which includes at least one image sensor for the generation of the image data and with meta data image generation means by which the meta data can be recorded in the form of image information detectable by the human eye so that the image data and the meta data can be generated as common digital image information. The invention further relates to a corresponding method.

During filming, clappers, so-called clapboards, are usually used to allow the synchronization of image and sound during cutting. As a rule, such clappers each include a board which can be written on and a movable stick arranged outside the board which is connected to the board via a hinge and can be slapped against the board for the generation of a clap sound.

In a classical clapboard made of wood, the board, which often has a black surface, has information on the film written on it in chalk such as the film title, the name of the director, the name of the cameraman, the number of the take, the number of the scene, the clapper number and the date of the recording. The information shown on the clappers is called meta data since it contains information on the respective recording. Alternatively to writing with chalk, it is also known to apply the information to the board using adhesive tape or by a hook and loop fastening.

In addition, clappers made of plexiglass are also known which, in contrast to the clappers described above, are made to transmit light so that the clapper does not have to be lit separately when filming, in particular with backlighting and/or so that an aperture setting of the film camera does not have to be changed.

At the start of a recording, a marked clapboard is held in the field of view of the film camera and is filmed by the film camera so that the clapboard and thus the meta data contained thereon can be seen on the first frame or on the first frames of a recording. The meta data are then available—just like the actual image data which reproduce the filmed surroundings and/or the story—in the form of image information detectable by the human eye, that is, for example, as a sequence of letters, numbers and/or symbols. Image information is here in particular to be understood as that information which represents the picture elements of an image (e.g. color values and brightness values relative to a picture element) or image formats generated therefrom by means of image processing.

It is furthermore known to store and/or manage specific meta data, for example the date and the time, separately from the actual image data with photo cameras and video cameras and only to superimpose them into the recorded images as required. However, this is not a generic apparatus since the image data and the meta data are not generated as common image information in the sense of this application.

It is the underlying object of the invention to set forth a simple and/or comfortable possibility of recording meta data in the form of image information.

This object is satisfied by an apparatus having the features of claim 1 and in particular in that the meta data image generation means include display means for the optical representation of meta data, in particular a display.

For a method, this object is satisfied by the features of claim 17 and in particular in that the meta data are shown optically on display means, in particular on a display.

In accordance with the invention, the meta data can be shown on an optical data display. It can hereby be ensured that the meta data are always easily legible, in particular in comparison with hand-written clappers. It is additionally hereby made possible or made easier to read the meta data automatically in cutting. Furthermore, the meta data can be changed fast and simply. In particular, meta data changeable in time, for example the time, can also be shown accurately at any time.

The relative position and/or orientation of the display means with respect to the image sensor is preferably laid down, in particular fixed, so that it is made possible to reflect meta data onto the same regions of the image sensor and/or with the same size across recordings, whereby a later reading of the meta data, in particular a reading of the meta data carried out automatically, can be further facilitated.

In accordance with an embodiment of the invention, mirror means are provided for the reflecting of the meta data shown on the display means onto the image sensor. Due to the possibility of reflecting meta data shown optically on display means directly into the film camera, it is no longer necessary to hold a clapboard in the field of view of the film camera. Furthermore, the meta data can be reflected onto the image data instantaneously, in particular at the press of a button, at any desired point in time.

In accordance with another embodiment of the invention, the meta data can be imaged for reflecting onto an intermediate image plane, in particular a ground glass screen, arranged between a taking lens associated with the digital camera and the image sensor. This is in particular of advantage when an intermediate image plane is already present, such as can in particular be the case on the use of a video camera with an image sensor, whose format does not precisely correspond to the format of the image sensor of a full-frame film camera for cinema productions and/or TV productions (35 mm full-frame image sensor). A video camera of this type namely has a lower focal length and a larger depth of field with respect to a full-frame film camera due to the smaller image sensor. In order nevertheless to achieve the lower depth of field of a full-frame film camera and the design effects associated therewith, a ground glass screen can be arranged in front of the camera lens of the video camera and a film camera lens for a full-frame film camera can in turn be arranged in front of it and can project an image onto the ground glass screen, said image then being able to be filmed by the video camera. So that the structure of the ground glass screen does not become visible during filming, the ground glass screen can in particular be moved in a rotating manner in the ground glass screen plane.

An optical imaging system is preferably provided for the imaging of the meta data onto the intermediate image plane and its optical axis is inclined at an angle different from zero and/or 90° with respect to the optical axis of the film camera. Different optical paths are possible. The meta data can in particular be able to be imaged onto the front side and/or the rear side of the intermediate image plane. Provided that the meta data are imaged onto the front side of the intermediate image plane, i.e. onto the side remote from the image sensor, it is preferred for means for image reflection to be provided to avoid a mirror-inverted reflection of the meta data onto the image sensor.

It is particularly preferred for the distortion of the geometry of meta data imaged onto the intermediate image plane occurring due to the mutually inclined optical axes to be able to be compensated with respect to the geometry of the meta data shown on the display means, for example by a corresponding tilting of the optical imaging system which compensates the distortion. The distortion can, however, preferably be compensated at the display means, in particular by distorted representation of the meta data on the display means.

In accordance with a farther embodiment of the invention, a beam splitter arranged on the optical axis of the film camera is provided for the reflecting in of the meta data. The beam splitter can be made as a partly transmitting mirror, in particular as a semi-transmitting mirror. With a digital reflex film camera, the beam splitter is in particular a rotating mirror shutter so that the number of additional components can be kept low with respect to a conventional digital film camera. The beam splitter is preferably provided between a camera lens associated with the film camera and the image sensor.

In accordance with a further embodiment of the invention, the display means can be coupled to a housing for an intermediate image plane, in particular for a ground glass screen. This makes it possible that the housing of a conventional film camera does not have to be changed and/or the film camera does not have to be matched to the display means and/or the reflection means. The display means can, however, also be able to be coupled to a housing of the film camera in particular when no intermediate image plane is used. A particularly compact design results when the display means are arranged inside the housing of the film camera.

In accordance with a further embodiment of the invention which is also claimed separately, the meta data image generation means include data processing means for the electronic generation of the meta data within the image data, in particular a controller, with the same advantages resulting as have been described above with respect to the apparatus in accordance with the invention with the display means. Separate optical display means are then, however, not necessarily required.

The image sensor preferably has sensor elements whose output signals can be preset by the data processing means. An artificial image can hereby be generated which contains the meta data in the form of image information. In particular no actual image has to be taken. A camera lens or taking lens associated with the film camera can be covered. The output signals of the sensor elements can in particular represent particularly bright, in particular white picture elements or particularly dark, in particular black, picture elements. If the image sensor is read out, the meta data are taken over into the data flow of the film camera.

In accordance with a further embodiment of the invention, the meta data generated by the data processing means can be converted into image information in the image processing after the reading out of the image sensor. It is in particular possible for the meta data to be converted into image information at different locations of the image processing path. The meta data can replace the actual image data or be superimposed on them.

An input device is preferably provided for the input of meta data, e.g. of the film title, by a user. The input device can, for example, be a PC, a laptop, a PDA or independent hardware. The input device is preferably connected to the display means and/or to the data processing means. The input device and the display means can be arranged in a common housing. The transfer of the meta data from the input device to the display means and/or to the data processing means can take place via cable or in a wireless manner, e.g. by radio, an IR interface or Bluetooth.

In accordance with a further embodiment of the invention, the meta data include taking parameters generated by the film camera itself and/or taking parameters input by the user. It can be a question, for example, of the set sensitivity of the image sensor, the image frequency of the recording, the starting format, image processing parameters and/or lens parameters.

Input data and/or data generated by the film camera can preferably be transferred to the meta data image generation means.

The present invention furthermore relates to an apparatus for the reading of meta data which are transferred from a digital film camera and which contain information on image data—such as recording parameters—and which are recorded in the form of image information detectable by the human eye so that the image data and the meta data are present as common image information, with means, in particular an OCR reader, being provided for the automatic extraction of the meta data from the image information. The invention further relates to a corresponding method.

Selection means are preferably provided for the automatic selection of images containing meta data from images including image information.

Non-restricting embodiments of the invention are shown in the drawing and will be described in the following.

There are shown, schematically in each case.

Figure 1:
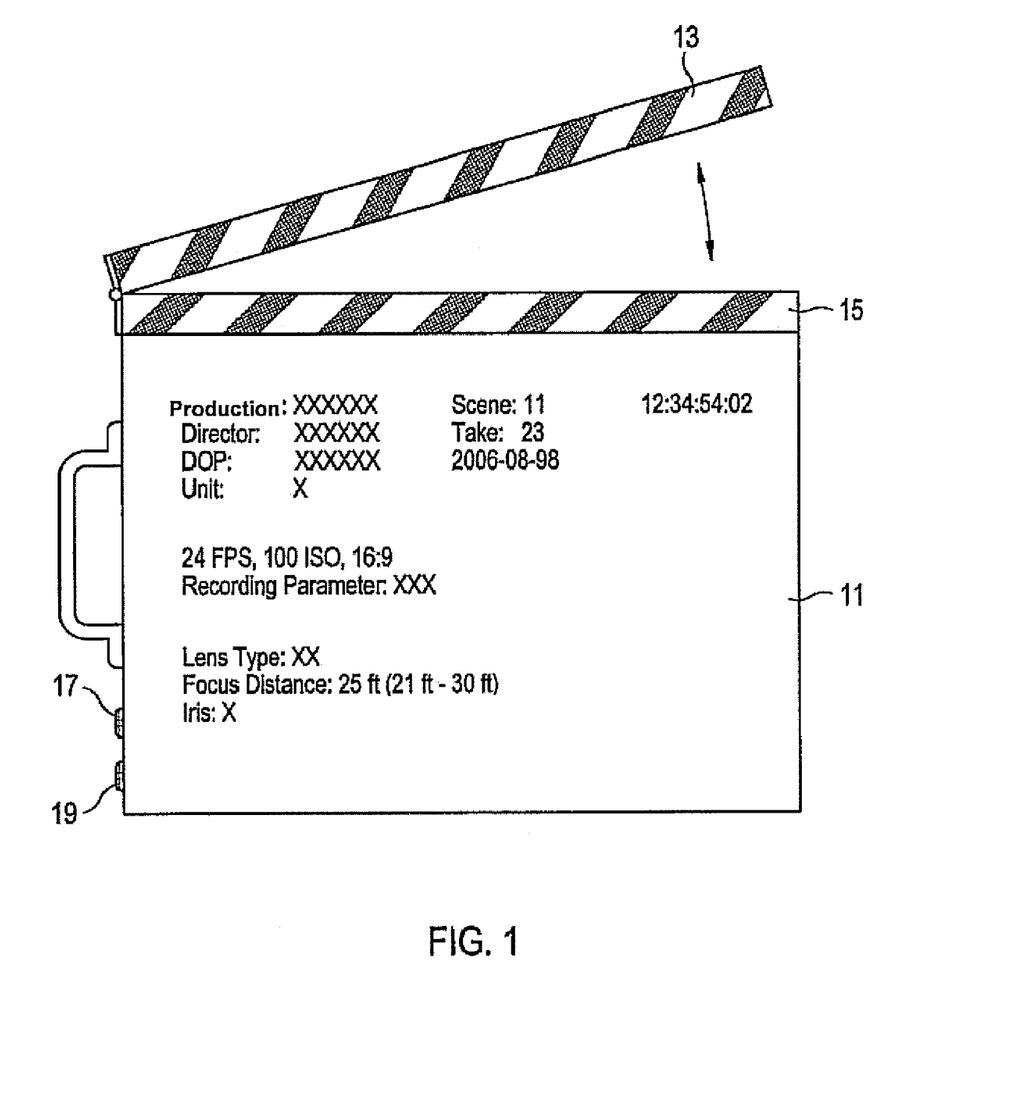
FIG. 1 a first embodiment of an apparatus in accordance with the invention with a clapboard.

The clapboard shown in FIG. 1 includes a power-operated display 11, in particular a TFT display, on which meta data are shown. The meta data shown include, for example, the film title, the name of the director and the name of the cameraman, the number of the take, the number of the scene and the number of the clapper, the date, the time, or recording parameters which are input by the user or are generated by the camera itself such as the frame frequency of the recording, the exposure time, the shutter setting, the distance setting, the sensitivity of the image sensor or the lens type. A controller, not shown, is provided for the management of the display of the meta data on the TFT display 11. The clapboard furthermore includes two sticks 13, 15 connected to one another by a hinge, with the stick 13 being slapped against the stick 15 connected to the TFT display 11 for the generation of a clap sound. Furthermore, the clapboard includes an input socket 17 for the power supply of the TFT display 11. Next to this, an input socket 19 is provided via which meta data input at an input device, not shown, can be transmitted to the controller of the clapboard. The clapboard is held in the field of view of a digital film camera at the start of a recording and its filmed by said digital film camera.

Figure 2A:
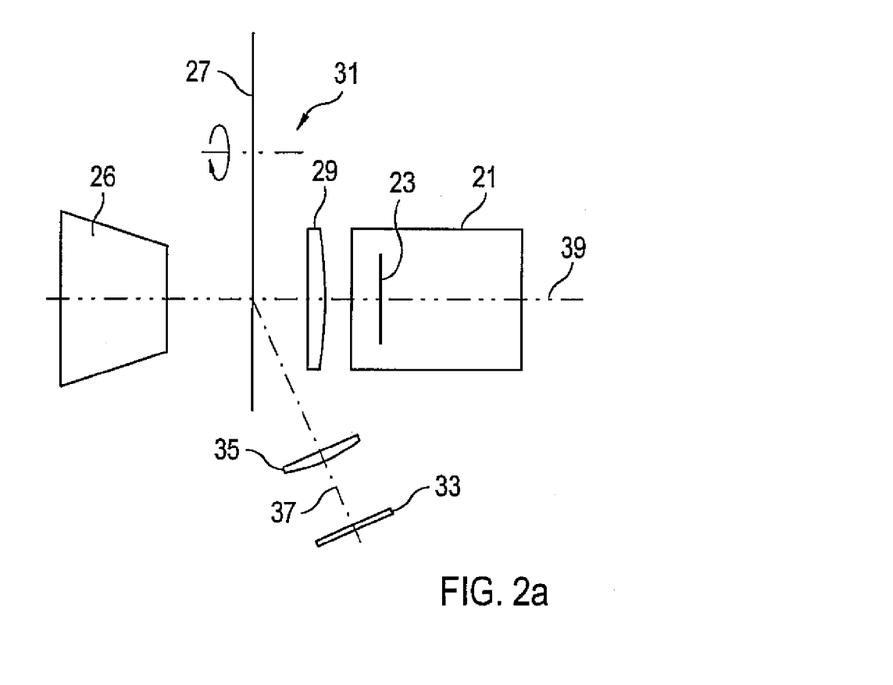
FIG. 2 a second embodiment of an apparatus in accordance with the invention with a display arranged outside the digital film camera.

The apparatus shown in FIG. 2a includes a digital video camera 21 having an image sensor 23, for example a CCD sensor or a CMOS sensor. The apparatus furthermore includes a taking lens 26. An adapter 31 which includes both a rotating ground glass screen 27 and a relay lens 29 in a common housing is provided between the video camera 21 and the taking lens 26. The taking lens 26 is placed on the adapter 31 and the adapter 31 is placed on the video camera 21. Furthermore, a power-operated display 33 is provided on which meta data can be shown.

The display 33 and thus the meta data displayed on the display 33 can be imaged via an optical imaging system 35 onto the rear side of the rotating ground glass screen 27 facing the image sensor 23. The optical axis 37 of the optical imaging system 35 is inclined with respect to the optical axis 39 of the video camera 21 by an angle amounting to between 0 and 90 degrees. The display 33 and the optical imaging system 35 are arranged in a common housing which is coupled to the adapter 31 such that the relative position and orientation of the display 37 is fixed with respect to the image sensor 23. A controller, not shown, is provided for the management and the display of the meta data on the TFT display 33.

The distortion of the geometry of the meta data shown on the display 33 which otherwise occurs due to the mutually inclined optical axes 37, 39 is compensated by the display 33. The display 33 and the optical imaging system 35 are preferably made in particular compact form. The design of the apparatus shown in FIG. 2a makes it possible to reflect meta data shown on the display 33 onto the image sensor 23. Meta data can hereby be recorded as image information.

An analog/digital converter, a signal processing device and a digital data storage device or a data output are, for example, connected after the image sensor 23.

Figure 2B:
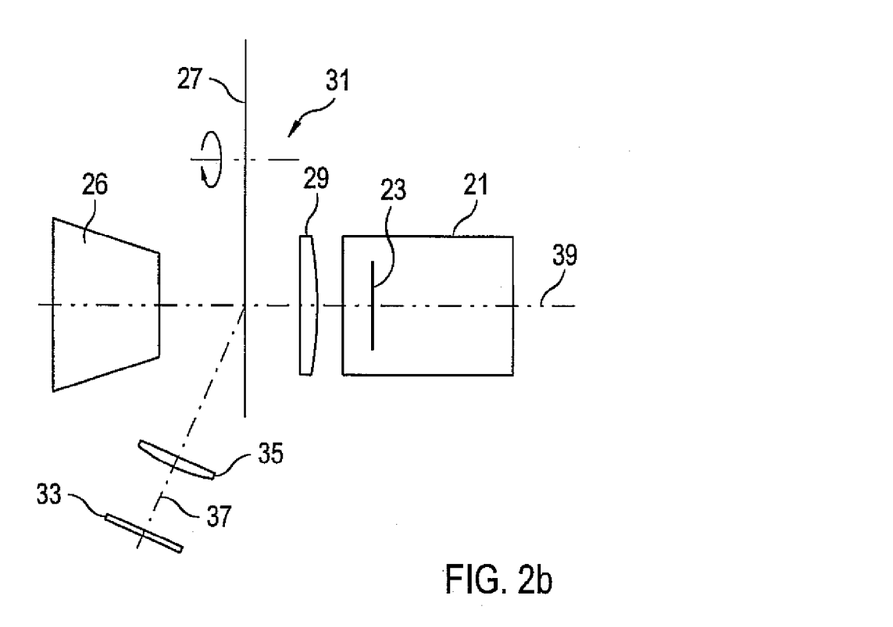

In contrast to the apparatus in accordance with FIG. 2a, in the apparatus in accordance with FIG. 2b, the display 33 and the optical imaging system 35 are positioned such that the meta data shown on the display 33 can be imaged onto the front side of the rotating ground glass screen 27 facing the lens 26. The meta data are therefore shown on the display 33 in mirror-inverted form to avoid a mirror-inverted reflection of the meta data onto the image sensor 22. Otherwise, the formation of the apparatus in accordance with FIG. 2b, however, corresponds to the formation of the apparatus in accordance with FIG. 2a.

Figure 2C:
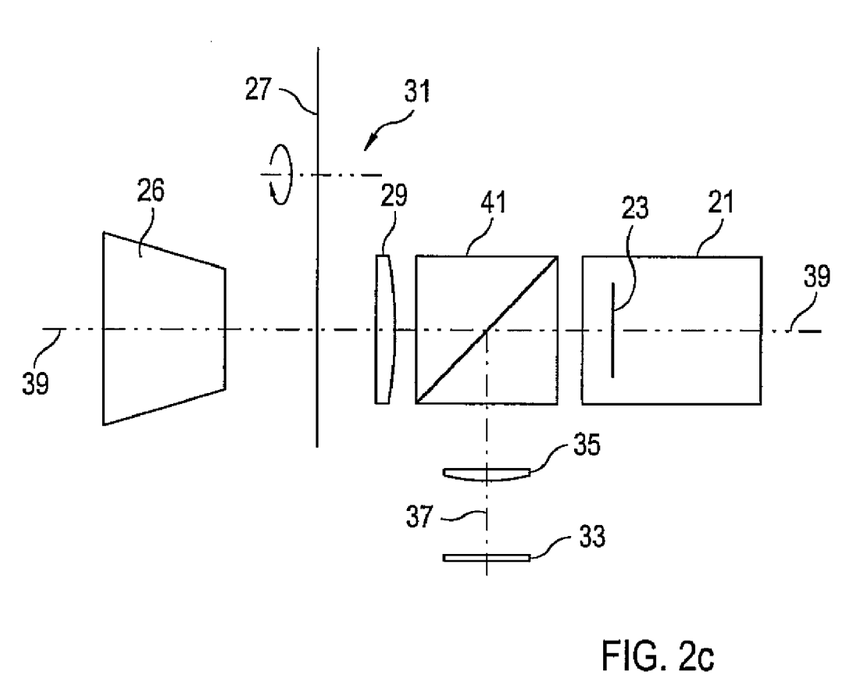

The apparatus in accordance with FIG. 2c likewise includes a digital video camera 21 with an image sensor 23, a taking lens 26 and an adapter 31 which includes a rotating ground glass screen 27 and a relay lens 29, with the taking lens 26 being placed on the adapter 31 and the adapter 31 being placed on the video camera 21. A beam splitter 41, in particular a semi-transmitting mirror, is arranged between the adapter 31 and the video camera 21 and is inclined by 45° with respect to the optical axis 39 of the video camera 21. Furthermore, a power-operated display 33 is provided on which meta data can be presented which can be reflected onto the image sensor 23 of the video camera 21 via an optical imaging system 35 and via the semi-transmitting mirror 41. The optical axis 37 of the optical imaging system 35 and the optical axis 39 of the video camera 21 include an angle of 90°. The display 33 and the optical imaging system 35 are arranged in a common housing which is coupled to the adapter 31 such that the relative position and orientation of the display 37 is fixed with respect to the image sensor 23.

Figure 3A:
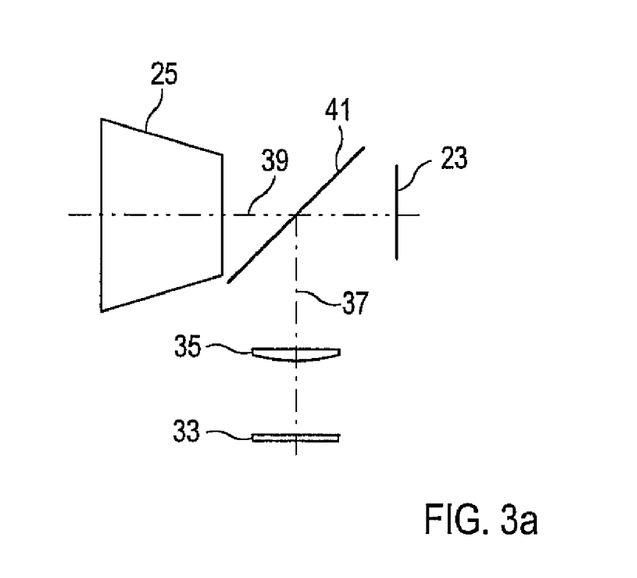
FIG. 3 a third embodiment of an apparatus in accordance with the invention with a display arranged inside the digital film camera.

FIG. 3a shows a digital full-frame film camera for cinema productions and/or television productions. The film camera includes an image sensor 23 and a camera lens 25 between which a beam splitter 41, in particular a semi-transmitting mirror, is arranged which is inclined at 45° with respect to the optical axis 39 of the film camera. A power-operated display 33 is furthermore provided on which meta data can be shown which are imaged onto the image sensor 23 via an optical imaging system 35 and the semi-transmitting mirror 41. The optical axis 37 of the optical imaging system 35 is in turn perpendicular on the optical axis 39 of the film camera. The display 33 and the optical imaging system 35 are located inside the housing of the film camera in the embodiment in accordance with FIG. 3a. A controller, not shown, is provided for the management and the display of the meta data on the display 33, said controller being able to be responsible only for the display 33 or also for the total film camera.

Figure 3B:
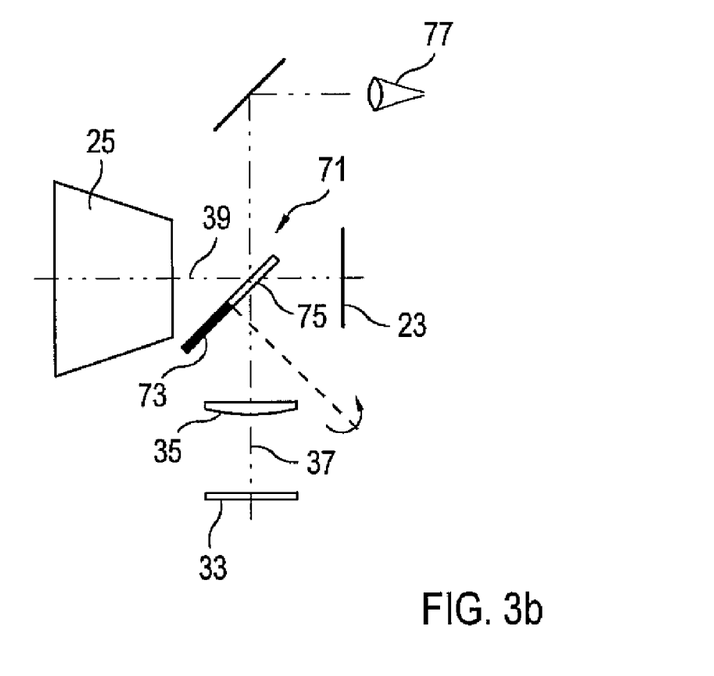

In contrast to the apparatus in accordance with FIG. 3a, the apparatus in accordance with FIG. 3b includes a rotating mirror shutter 71 instead of a semi-transmitting mirror. Otherwise, the formation of the apparatus in accordance with FIG. 3b, however, corresponds to the formation of the apparatus in accordance with FIG. 3a. The rotating mirror shutter 71 has, in a manner known per se, at least one reflecting angular segment 73 and a transparent angular segment 75, with the transparent angular segment 75 being mirror coated in a semi-transmitting manner at its rear side facing the image sensor 23. In addition, an optical viewfinder 77 known per se is shown.

Figure 4:
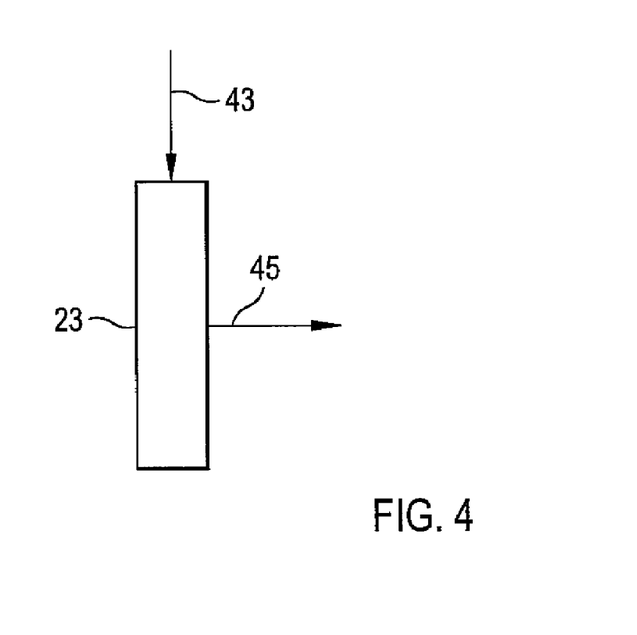
FIG. 4 a fourth embodiment of an apparatus in accordance with the invention with a presentable image sensor.

In the embodiment in accordance with FIG. 4, an image sensor 23 of a digital film camera includes a data input 43 via which the output signals of the sensor elements can be preset, i.e. predetermined signal values can be generated via the data input 43. The preset output values are output via a data output 45 which corresponds to the data output of a conventional image sensor. It is thus possible to generate an artificial image in an electronic fashion in which the meta data are present as image information. If the image sensor 23 is read out, the meta data are taken over in the data stream of the digital film camera. A controller, not shown, which is responsible for the total digital film camera is provided for the presetting of the output signals of the sensor elements of the image sensor 23.

Figure 5A:
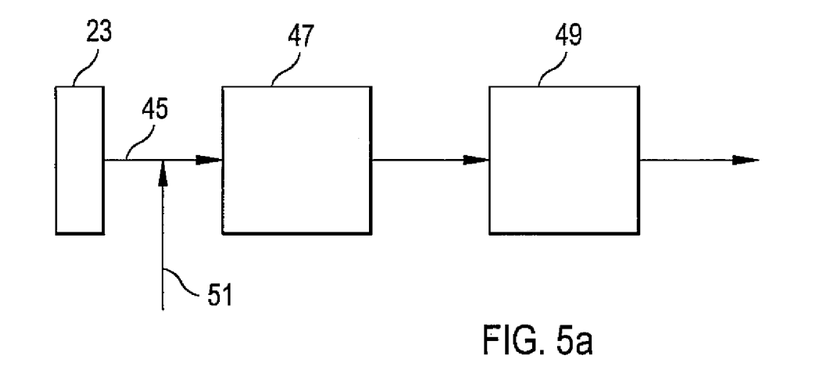
FIG. 5 a fifth embodiment of an apparatus in accordance with the invention.
Figure 5B:
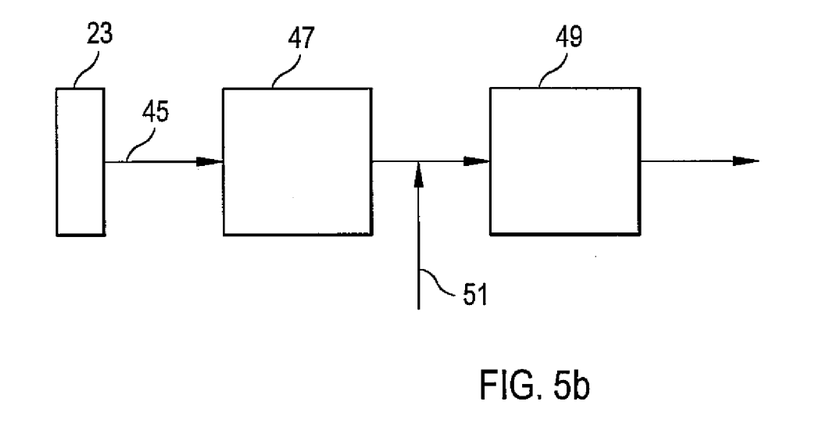
Figure 5C:
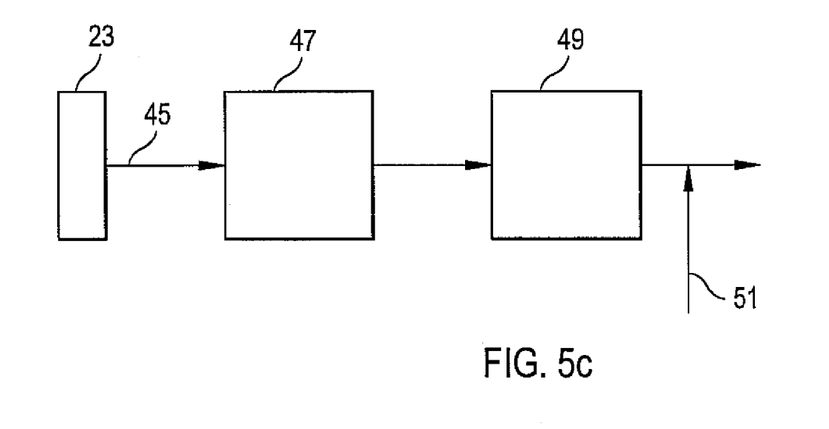

In the embodiment in accordance with FIG. 5, meta data 51 generated by a controller, not shown, are converted into image information in the image processing after reading out of an image sensor 23 of a digital film camera. The meta data 51 can be converted into image information at different locations of the image processing path. In accordance with FIG. 5a, the meta data 51 are superimposed on the data output 45 of the image sensor 23 directly after the reading out of the image sensor 23. Alternatively, the output signals of the corresponding sensor elements can, however, also be completely replaced. In accordance with FIG. 5b, the meta data 51 are fed into the image processing path after a first function block 47. In accordance with FIG. 5c, the meta data 51 are fed into the image processing path after a second function block 49. The image processing block 47 can, for example, be a function block for color preparation. The function block 49 can, for example, be a function block for the conversion of the individual picture elements of the image sensor 23 into a specific file format or image format for the storage of image information. In the embodiment in accordance with FIG. 5, care is preferably taken that the time period passed to the corresponding image from the recording of an image by the image sensor 23 up to the feeding of the meta data 51 into the image processing path is taken into account in the recording of the time. If, for example, the current image is in the image sensor 23, the last image is in the functional unit 47 and the penultimate image is in the functional unit 49, it is not the current time which is recorded in the case of FIGS. 5b or 5c, but rather the time at which the last image or the penultimate image was still in the image sensor 23.

Figure 6A:
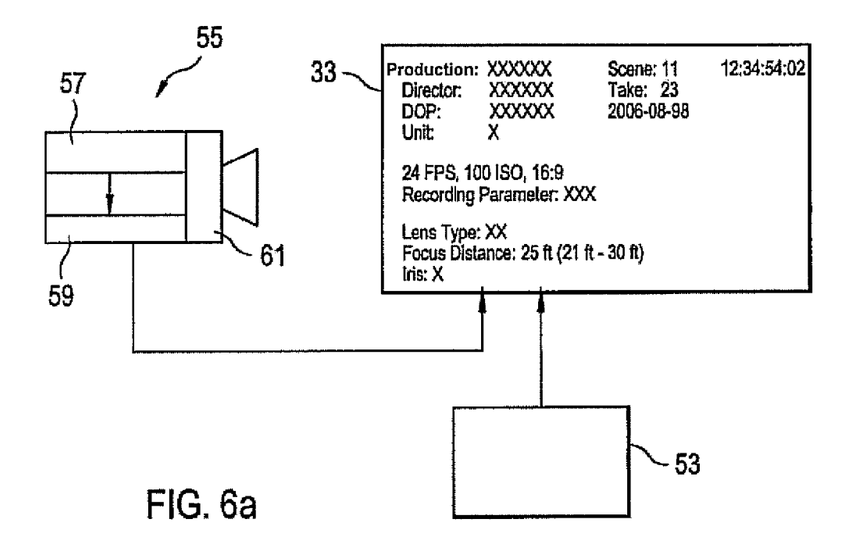
FIG. 6 an apparatus in accordance with the invention with an input device for the input of meta data by a user.
Figure 6B:
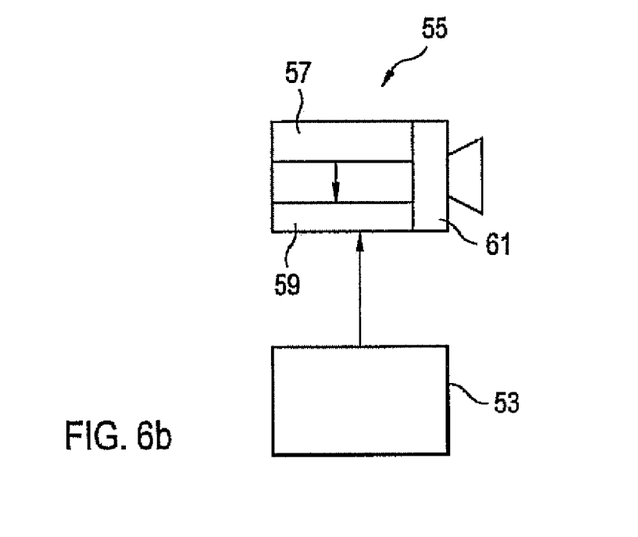

An input device 53, such as is shown in FIG. 6, is provided for the input of meta data by a user. They are meta data which do not relate to the film camera itself, but rather to meta data written on classical clappers such as the film title. The input device 53 can, for example, be a PC, a laptop, a PDA or a device separately developed for this purpose. The transfer of the meta data from the input device 53 to the display 33 takes place via cable or in a wireless manner. Furthermore, a digital film camera 55 is shown in FIG. 6 which includes a controller 59 which transfer meta data to the display 33. The meta data transmitted via the controller 59 are data which were input via an operating panel 57 of the film camera 55, such as the frame frequency of the recording, or which were generated by the film camera 55 itself and, for example, include data with respect to a lens 61 of the film camera 55 or likewise the frame recording frequency. With the apparatus in accordance with FIG. 6a, the display 33 is arranged outside the film camera 55 so that the meta data of the controller 59 are transmitted to the display 33 via cable or in a wireless manner. With the apparatus in accordance with FIG. 6b, the display is either integrated into the film camera 55 or no display at all is present. The input device 53 can, in contrast to the illustration in FIG. 6, also be fixedly connected to the display 33 or to the film camera 55.

Figure 7A:
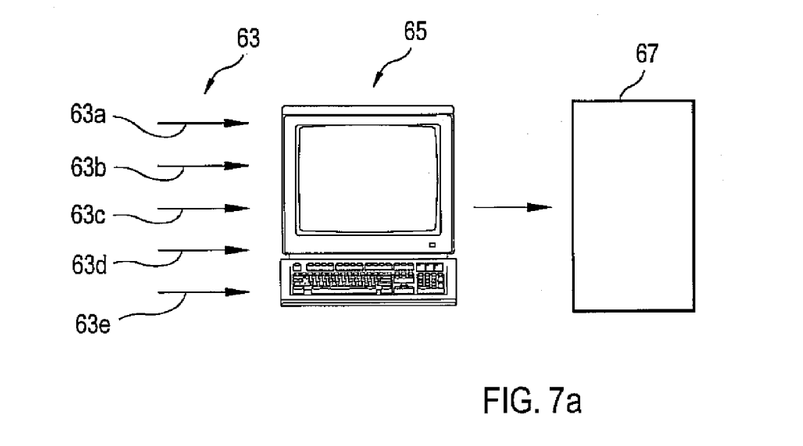
FIG. 7 an apparatus in accordance with the invention for the reading of meta data transmitted by a digital film camera.
Figure 7B:
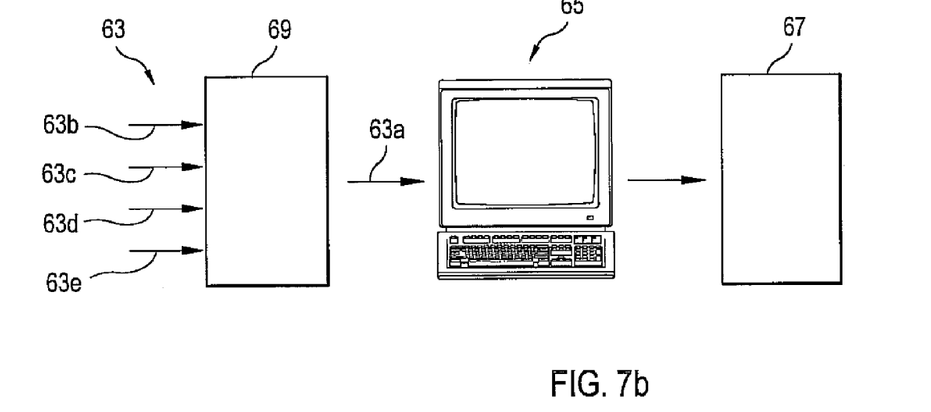

The image information with the meta data contained therein can be transmitted to a reading unit 65, such as is shown in FIG. 7, for example a PC, at any desired point in time after the recording of the digital image information (image data and meta data). The reading unit 65 is configured to first automatically select those images from the transmitted images in which meta data are contained. The meta data are then automatically extracted from the selected images by an image pattern recognition (e.g. optical character recognition, OCR) and are output into a list 67. The reading unit 65 can be made such that the most varied image formats can be processed, for example HD video 63a, SD video 63b, raw data 63c, an image sequence 63d or another format 63e (FIG. 7a). The reading unit 65 can, however, also be made such that only a standard input is present, for example HD video 63a. In this case, transferred images which have a different format are previously converted by a converter 69 from the respective image format 63b, 63c, 63d, 63e into the standard format 63a (FIG. 7b).

REFERENCE NUMERAL LIST 11 display
13 stick
15 stick
17 input socket
19 input socket
21 digital video camera
23 image sensor
25 camera lens
26 taking lens
27 ground glass screen
29 relay lens
31 adapter
33 display
35 optical imaging system
37 optical axis
39 optical axis
41 beam splitter
43 data input
45 data output
47 function block
49 function block
51 meta data
53 input device
55 digital film camera
57 operating panel
59 controller
61 lens
63 image format
65 reading unit
67 list
69 converter
71 rotating mirror shutter
73 reflecting segment
75 transparent segment
77 optical viewfinder

The invention claimed is:

1. An apparatus for the recording of image data and meta data which contain information on the image data—such as recording parameters—with a digital film camera (21, 55) which includes at least one image sensor (23) for the generation of the image data and with meta data image generation means (11, 33, 59) by which the meta data can be recorded in the form of image information detectable by the human eye so that the image data and the meta data can be generated as common image information,
characterized in that
the meta data image generating means (11, 33, 59) include display means (11, 33) for the visual representation of meta data, in particular a display, and
characterized in that reflection means (27, 29, 35, 41) are provided for the reflection of the meta data shown on the display means (33) onto the image sensor (23), and
characterized in that the meta data can be imaged onto an intermediate image plane (27), in particular a ground glass screen, arranged between a taking lens (26) associated with the digital camera (21, 55) and the image sensor (23).

2. An apparatus in accordance with claim 1, characterized in that the relative position and/or orientation of the display means (33) with respect to the image sensor (23) is laid down, in particular fixed.

3. An apparatus in accordance with claim 1, characterized in that an optical imaging system (35) is provided for the imaging of the meta data onto the intermediate image plane (27) and its optical axis (37) is inclined at an angle different from zero and/or 90° with respect to the optical axis (39) of the film camera (21, 55).

4. An apparatus in accordance with claim 3, characterized in that the distortion of the geometry of the meta data imaged onto the intermediate image plane (27) occurring due to the mutually inclined optical axes (37, 39) can be compensated with respect to the geometry of the meta data shown on the display means (33).

5. An apparatus in accordance with claim 1, characterized in that a beam splitter (41), in particular a partly transmitting mirror and/or a rotating mirror shutter, arranged on the optical axis (39) of the film camera (21, 55) is provided.

6. An apparatus in accordance with claim 1, characterized in that the display means (33) can be coupled to a housing for an intermediate image plane (27), in particular for a ground glass screen, and/or to a housing of the film camera or are arranged inside the housing of the film camera (21, 55).

7. An apparatus in accordance claims 1 characterized in that an input device (53) is provided for the input of meta data by a user.

8. An apparatus in accordance with claim 1, characterized in that the meta data include recording parameters generated by the film camera (21, 55) itself and/or recording parameters input by the user.

9. An apparatus in accordance with claim 1, characterized in that input data and/or data generated by the film camera (21, 55) can be transferred to the meta data image generation means (11, 33, 59).

10. An apparatus for the recording of image data and meta data which contain information on the image data—such as recording parameters—with a digital film camera (21, 55) which includes at least one image sensor (23) for the generation of the image data and with meta data image generation means (11, 33, 59) by which the meta data can be recorded in the form of image information detectable by the human eye so that the image data and the meta data can be generated as common image information, characterized in that the meta data image generating means (11, 33, 59) include data processing means (59) for the electronic generation of the meta data inside the image data, in particular a controller characterized in that the image sensor (23) has sensor elements whose output signals can be preset by the data processing means (59).

11. An apparatus in accordance with claim 10, characterized in that the meta data generated by the data processing means (59) can be converted into image information in the image processing after reading out of the image sensor (23).

12. An apparatus for the reading of meta data which are transmitted by a digital film camera (21, 55), which contain information on image data—such as recording information—and which are recorded in the form of image information detectable by the human eye so that the image data and the meta data are present as common image information, characterized in that means for image pattern recognition (65) are provided for the automatic extraction of the meta data from the image information.

13. An apparatus in accordance with claim 12, characterized in that selection means (65) are provided for the automatic selection of images containing meta data from images including image information.

14. A method for the recording of image data and meta data which contain information on the image data—such as recording parameters—by means of a digital film camera (21, 55) which includes at least one image sensor (23) for the generation of the image data, wherein the meta data are recorded in the form of image information detectable by the human eye so that the image data and the meta data are generated as common image information, characterized in that the meta data are shown visually on display means (11, 33), in particular on a display, and characterized in that the meta data shown on the display means (11, 33) are reflected onto the image sensor (23), and characterized in that, for reflection, the meta data are imaged, in particular at an angle different from zero and/or 90° with respect to the optical axis (39) of the film camera (21, 55), onto an intermediate image plane (27), in particular a ground glass screen, arranged between a taking lens (26) and the image sensor (23).

15. A method in accordance with claim 14, characterized in that the distortion of the geometry of the meta data imaged onto the intermediate image plane (27) occurring due to the mutually inclined optical axes (37, 39) is compensated with respect to the geometry of the meta data shown on the display means (33).

16. A method in accordance with claim 14, characterized in that meta data are input into an input device (53) by a user.

17. A method in accordance with claim 14, characterized in that meta data including recording parameters are generated by the film camera (21, 55) and/or meta data including recording parameters are input by the user.

18. A method in accordance with claim 14, characterized in that input meta data and/or meta data generated by the film camera (21, 55) are transferred to the display means (11, 33) and/or to the data processing means (59).

19. A method for the recording of image data and meta data which contain information on the image data—such as recording parameters—by means of a digital film camera (21, 55) which includes at least one image sensor (23) for the generation of the image data, wherein the meta data are recorded in the form of image information detectable by the human eye so that the image data and the meta data are generated as common image information, characterized in that the meta data are generated electronically by data processing means (59), in particular a controller, and characterized in that the output signals of sensor elements of the image sensor (23) of the film camera (21, 55) are preset by the data processing means (59).

20. A method for the reading of meta data which are transmitted by a digital film camera (21, 55), which contain information on image data—such as recording information—and which are recorded in the form of image information detectable by the human eye so that the image data and the meta data are present as common image information, characterized in that image patterns are automatically recognized for the extraction of the meta data from the image data.

21. A method in accordance with claim 20, characterized in that images containing meta data are automatically selected from images including image data before the extraction.

22. An apparatus for the recording of image data and meta data which contain information on the image data—such as recording parameters—with a digital film camera (21, 55) which includes at least one image sensor (23) for the generation of the image data and with meta data image generation means (11, 33, 59) by which the meta data can be recorded in the form of image information detectable by the human eye so that the image data and the meta data can be generated as common image information, characterized in that the meta data image generating means (11, 33, 59) include display means (11, 33) for the visual representation of meta data, in particular a display, and characterized in that reflection means (27, 29, 35, 41) are provided for the reflection of the meta data shown on the display means (33) onto the image sensor (23), and characterized in that a beam splitter (41), in particular a partly transmitting mirror and/or a rotating mirror shutter, arranged on the optical axis (39) of the film camera (21, 55) is provided.

23. An apparatus for the recording of image data and meta data which contain information on the image data—such as recording parameters—with a digital film camera (21, 55) which includes at least one image sensor (23) for the generation of the image data and with meta data image generation means (11, 33, 59) by which the meta data can be recorded in the form of image information detectable by the human eye so that the image data and the meta data can be generated as common image information, characterized in that the meta data image generating means (11, 33, 59) include display means (11, 33) for the visual representation of meta data, in particular a display, and characterized in that the display means (33) can be coupled to a housing for an intermediate image plane (27), in particular for a ground glass screen, and/or to a housing of the film camera or are arranged inside the housing of the film camera (21, 55).

24. An apparatus for the recording of image data and meta data which contain information on the image data—such as recording parameters—with a digital film camera (21, 55)

which includes at least one image sensor (23) for the generation of the image data and with meta data image generation means (11, 33, 59) by which the meta data can be recorded in the form of image information detectable by the human eye so that the image data and the meta data can be generated as common image information, characterized in that the meta data image generating means (11, 33, 59) include data processing means (59) for the electronic generation of the meta data inside the image data, in particular a controller,     characterized in that the meta data generated by the data processing means (59) can be converted into image information in the image processing after reading out of the image sensor (23).

25. A method for the recording of image data and meta data which contain information on the image data—such as recording parameters—by means of a digital film camera (21, 55) which includes at least one image sensor (23) for the generation of the image data, wherein the meta data are recorded in the form of image information detectable by the human eye so that the image data and the meta data are generated as common image information,     characterized in that     the meta data are generated electronically by data processing means (59), in particular a controller, and     characterized in that the meta data generated by the data processing means (59) are converted into image information in the image processing after reading out of the image sensor (23).

\* \* \* \* \*

UNITED STATES PATENT AND TRADEMARK OFFICE
CERTIFICATE OF CORRECTION

PATENT NO. : 7,782,371 B2  Page 1 of 1
APPLICATION NO. : 11/872980
DATED : August 24, 2010
INVENTOR(S) : Klaus Jacumet et al.

It is certified that error appears in the above-identified patent and that said Letters Patent is hereby corrected as shown below:

On the title page, item [73] should read:
Assignee: Arnold & Richter Cine Technik GmbH & Co. Betriebs KG, Munich (DE)

Signed and Sealed this
Seventeenth Day of May, 2011

David J. Kappos
*Director of the United States Patent and Trademark Office*